United States Patent
Iwamura

(10) Patent No.: US 7,171,506 B2
(45) Date of Patent: Jan. 30, 2007

(54) PLURAL INTERFACES IN HOME NETWORK WITH FIRST COMPONENT HAVING A FIRST HOST BUS WIDTH AND SECOND COMPONENT HAVING SECOND BUS WIDTH

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 327 days.

(21) Appl. No.: 10/779,400

(22) Filed: Feb. 16, 2004

(65) Prior Publication Data

US 2005/0108760 A1    May 19, 2005

Related U.S. Application Data

(60) Provisional application No. 60/520,591, filed on Nov. 17, 2003.

(51) Int. Cl.
*G06F 1/00* (2006.01)

(52) U.S. Cl. ............... 710/305; 710/315; 710/61; 710/307; 710/310

(58) Field of Classification Search ........ 710/305–317, 710/58–64, 36–38, 72, 8–19; 709/201–203; 725/219, 74
See application file for complete search history.

(56) References Cited

U.S. PATENT DOCUMENTS

| | | | |
|---|---|---|---|
| 4,300,207 A | 11/1981 | Eivers et al. | 364/900 |
| 4,649,428 A | 3/1987 | Jones et al. | 358/188 |
| 4,852,043 A | 7/1989 | Guest | 364/900 |
| 4,884,287 A | 11/1989 | Jones et al. | 375/121 |
| 4,989,081 A | 1/1991 | Miyagawa et al. | 358/93 |
| 5,287,547 A | 2/1994 | Hidaka | 455/4.2 |
| 5,485,630 A | 1/1996 | Lee et al. | 455/422 |
| 5,579,308 A | 11/1996 | Humpleman | 370/58.1 |
| 5,619,722 A | 4/1997 | Lovrenich | 395/822 |
| 5,649,123 A | 7/1997 | Kowert | 395/289 |
| 5,649,129 A | 7/1997 | Kowert | 395/309 |
| 5,761,416 A | 6/1998 | Mandal et al. | 395/200.08 |
| 5,905,942 A | 5/1999 | Stoel et al. | 455/4.2 |
| 5,940,387 A | 8/1999 | Humpleman | 370/352 |
| 5,973,722 A | 10/1999 | Wakai et al. | 348/8 |
| 6,005,861 A | 12/1999 | Humpleman | 370/352 |
| 6,202,211 B1 | 3/2001 | Williams, Jr. | 725/78 |
| 6,401,159 B1 | 6/2002 | Wang | 710/315 |
| 6,493,874 B2 | 12/2002 | Humpleman | 725/78 |
| 6,513,085 B1* | 1/2003 | Gugel et al. | 710/305 |
| 6,526,581 B1* | 2/2003 | Edson | 725/74 |
| 6,567,876 B1* | 5/2003 | Stufflebeam | 710/303 |
| 6,622,304 B1 | 9/2003 | Carhart | 725/74 |
| 6,665,020 B1 | 12/2003 | Stahl et al. | 348/552 |
| 6,678,892 B1 | 1/2004 | Lavelle et al. | 725/75 |
| 6,742,063 B1* | 5/2004 | Hellum et al. | 710/66 |
| 6,759,946 B2* | 7/2004 | Sahinoglu et al. | 340/310.11 |
| 6,823,420 B2* | 11/2004 | Io et al. | 710/307 |
| 2002/0107947 A1 | 8/2002 | Moragne et al. | 709/223 |

(Continued)

*Primary Examiner*—Mark H. Rinehart
*Assistant Examiner*—Raymond N Phan
(74) *Attorney, Agent, or Firm*—John L. Rogitz

(57) ABSTRACT

Universal network interfaces for a home network connect disparate components to the network, such as relatively complex components (TVs, computers) and relatively simple components (audio boom boxes).

11 Claims, 6 Drawing Sheets

PLC Interface

U.S. PATENT DOCUMENTS

2002/0194596 A1* 12/2002 Srivastava .................... 725/37
2003/0093812 A1   5/2003 Chang et al. ................ 725/133
2004/0022304 A1*  2/2004 Santhoff et al. ............ 375/219
2004/0255069 A1* 12/2004 Brescia, Jr. ................. 710/305
2005/0131558 A1*  6/2005 Braithwaite et al. .......... 700/94

* cited by examiner

Power Line Network

Server Block Diagram

Client TV

Client Audio System

PLC Interface

Protocol Stack

PLURAL INTERFACES IN HOME NETWORK WITH FIRST COMPONENT HAVING A FIRST HOST BUS WIDTH AND SECOND COMPONENT HAVING SECOND BUS WIDTH

RELATED APPLICATIONS

This application claims priority from U.S. provisional patent application Ser. No. 60/520,591, filed Nov. 17, 2003.

BACKGROUND OF THE INVENTION

1. Field of the Invention

The present invention relates generally to home entertainment systems.

2. Description of the Related Art

Home entertainment networks have been provided that can include a set-top box media server that communicates with various components in the home, e.g., TVs, laptop computers, custom display devices, phones, and other electronic devices. Home network communication technologies (e.g., 802.11 wireless, UWB (Ultra Wide Band), PLC (Power Line Communication), etc.) are widely used as their costs decrease. As critically recognized herein, not all devices that may be desired to be placed on the network have the same internal hardware architecture and, hence, one network interface does not fit all. For example, an Ethernet card for a personal computer (PC) usually has a PCI interface and PCI ready, and the Ethernet card can be mounted to an expansion PCI slot in the PC to establish a network interface, while an inexpensive audio product, for example, a boom box, might use an inexpensive 8-bit micro-controller and a conventional 8-bit wide internal bus, thus requiring another kind of network interface than the PC. Simply installing a PCI bus in such a relatively inexpensive device is too expensive and meaninglessly too fast for such a cost-sensitive audio product. Accordingly, to connect various disparate products to the home network, an inexpensive and flexible network interface is required.

SUMMARY OF THE INVENTION

A home entertainment network includes a network path and a first component, such as a server-or TV, having a data bus of a first bus width. The network also includes a second component, such as an audio player, having a data bus of a second bus width, with the second bus width being different from the first bus width. Respective network interfaces connect each component to the network path.

In the preferred embodiment each network interface includes at least one data stream port, a host bus interface communicating with a host bus of the respective component, and a network communication port communicating with a common network backbone. A switch can selectively connect the network communication port of a network interface to either the host bus interface or to the data stream port. The host bus interface of a network interface may be configured (by, e.g., the respective component) to have a bus width equal to the bus width of the component with which it is associated.

In preferred embodiments each network interface includes at least one packetizing/depacketizing component between the switch and the network communication port. Also, each preferred network interface includes an internal bus establishing at least a portion of a communication path between the host bus interface and the network communication port, whereby the host bus interface can communicate data directly to the network communication port, bypassing the packetizing/depacketizing component.

In another aspect, first and second interfaces are disclosed for communicating data in a home network having at least a server, a first component having a first host bus defining a first bus width, and a second component having a second host bus defining a second bus width. The first interface includes a host bus interface configured for communicating data with the first host bus and having the first bus width. The first interface also has at least one data port, a network port connectable to the network, and a switch selectively connecting the network port to either the host bus interface or data port. Likewise, the second interface includes a host bus interface configured for communicating data with the second host bus and having the second bus width. The second interface also has at least one data port, a network port connectable to the network, and a switch selectively connecting the network port to either the host bus interface or data port. The interfaces are identical in configuration and operation except for the bus width of the respective host bus interfaces.

In yet another aspect, a home entertainment system includes a first component having a first host bus with a first bus width and communicating with a network using a first universal network interface. The system also includes a second component having a second host bus with a second bus width and communicating with a network using a second universal network interface. Each universal network interface has a respective host bus interface that is configurable for communicating with a component host bus of the respective component. The universal network interfaces are identical to each other at least prior to configuration of the respective host bus interfaces.

In still another aspect, a home entertainment system includes a first component having a first host bus with a first bus width and communicating with a network. First universal network interface means are provided for interconnecting the first component with the network. A second component has a second host bus with a second bus width, and the second component communicates with the network. Second universal network interface means interconnect the second component with the network.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
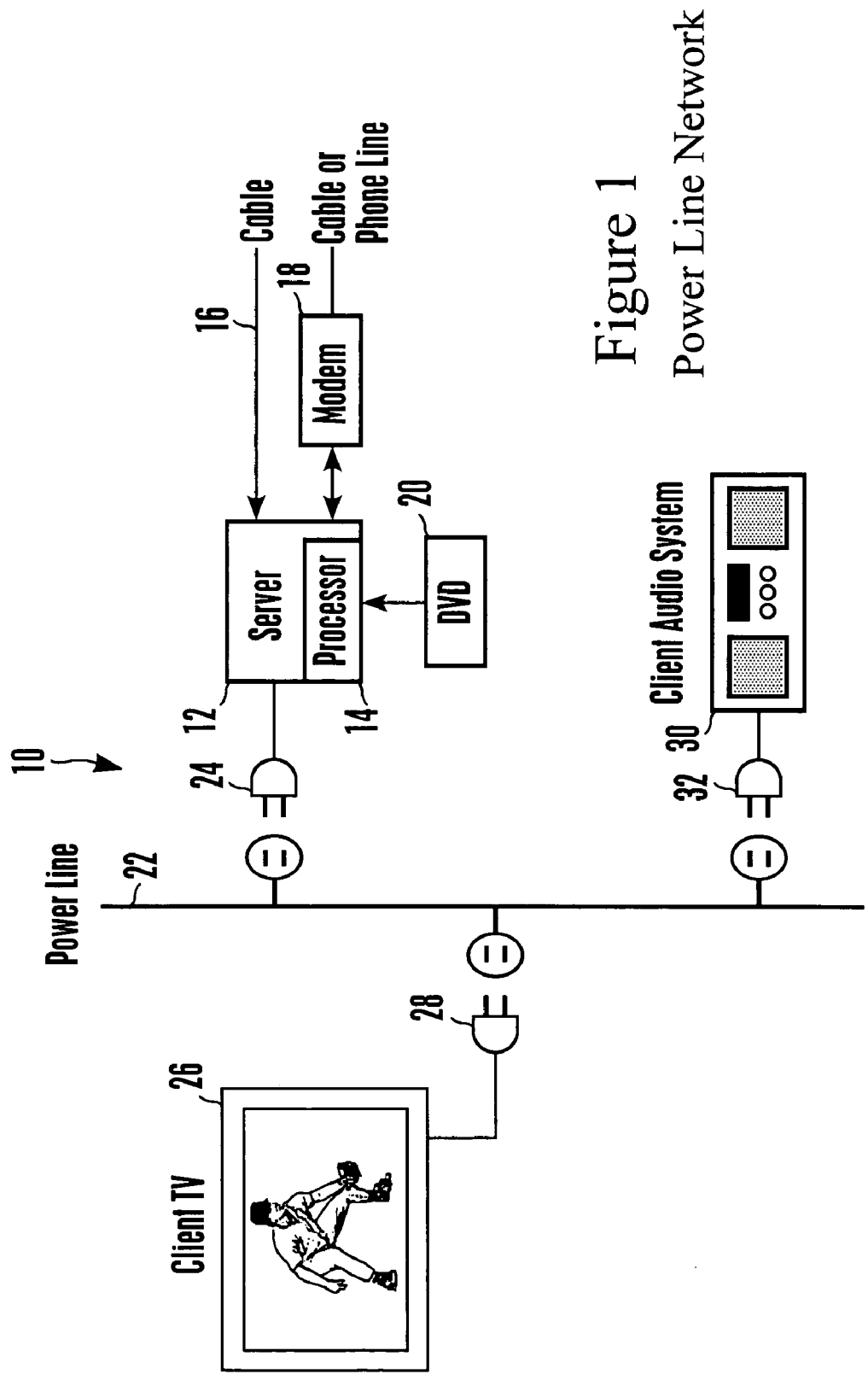
FIG. 1 is a block diagram of the system of the present invention.

Referring initially to FIG. 1, a home entertainment network is shown, generally designated 10, that includes a server 12 having a processor or processors 14 that may be housed in a set-top box or personal video recorder (PVR) or other component. The server 12 can receive televised content from an antenna, satellite dish, cable, etc. for display of the content on one or more of the below-described system components. The processor 14 alternatively can be incorporated into the housing of a TV to function in accordance with the disclosure herein, or it can be implemented by plural processors (e.g., one in a PVR and one in the TV or set-top box) acting in concert with each other. Or, the server 12 may be implemented by a computer such as a PC or laptop.

The preferred server 12 shown in FIG. 1 includes one or more communication systems as disclosed further below, including, for example, a wireless communication system such as an 802.11 communication system and/or a wired communication system. The wireless communication system can be an (IR) system or rf system or other wireless system, while the wired communication system (as shown in the exemplary implementation shown in FIG. 1) can be a power line communication (PLC) network or other wire network, such as an IEEE 1394 bus.

As shown in FIG. 1, the server 12 can receive a TV signal from a cable line 16 and/or from a modem 18 such as a cable or xDSL modem. Also, if desired the server 12 may access the Internet through the modem 18. If desired, a DVD player 20 may be connected to appropriate audio/video ports of the server 12, which can send and receive audio/video streams and commands over a power line 22 through a server power plug 24. The power line 22, in a wired network, essentially establishes a network backbone.

The network 10 shown in FIG. 1 may also include one or more client devices that have internal host buses configured for communication using first parallel data capacities, e.g., that can have internal PCI buses with a bus width of 64 bits or 128 bits. One such device is a client TV 26 that receives an audio/video stream and exchanges commands over the power line 22 through a TV power plug 28. Furthermore, the network 10 shown in FIG. 1 may also include one or more client devices that have internal host buses configured for communication using second parallel data capacities, e.g., that can have relatively simple internal 64 Kbyte buses with a bus width of eight bits or sixteen bits. One such device is a client audio system 30 such as a boom box that receives and decodes audio data sent from the server 12. The audio data may be a live program from the cable network or music data stored in an internal HDD (Hard Disk Drive) of the server 12. As shown in FIG. 1, the client audio system 30 may communicate with the power line 22 through an audio power plug 32.

Figure 2:
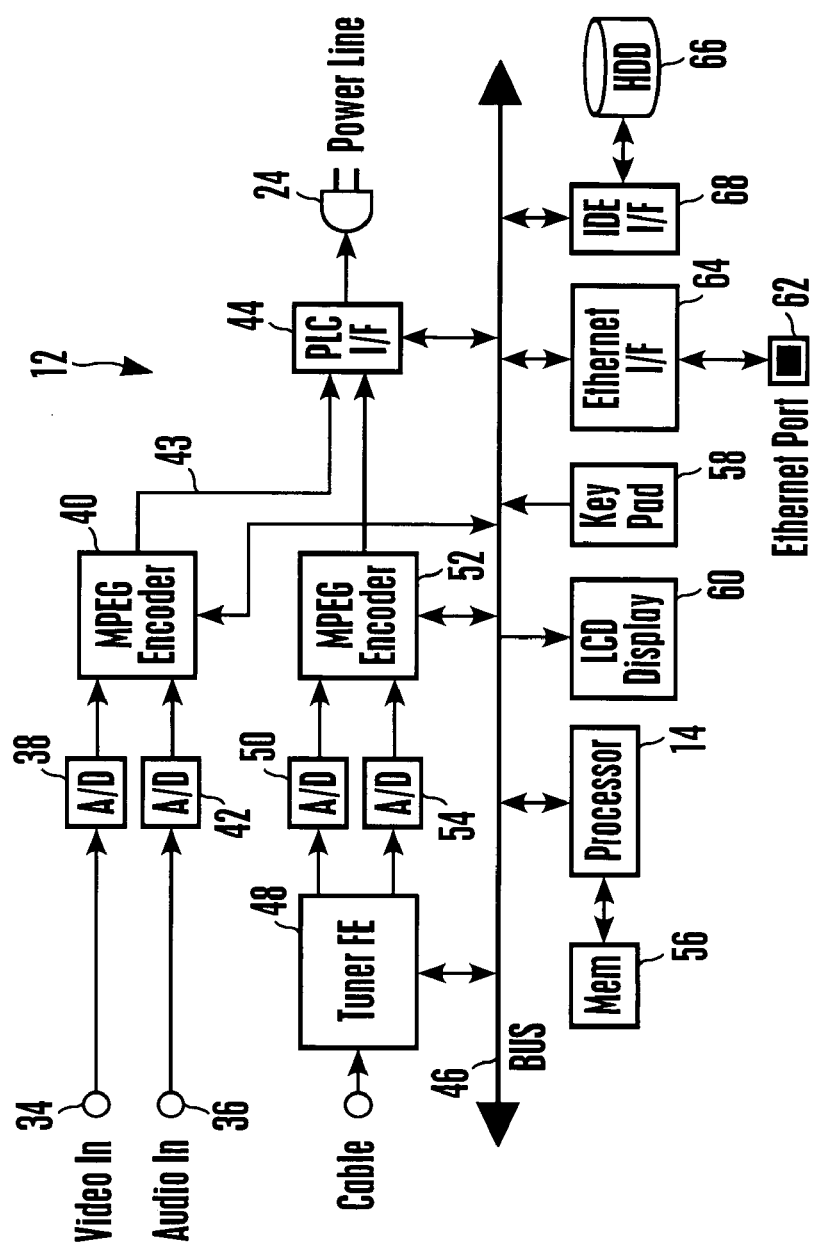
FIG. 2 is a block diagram of the server.

Now referring to FIG. 2, the details of one non-limiting exemplary server 12 may be seen. As shown, the server may include a Video In terminal 34 and an Audio In terminal 36 that can be analog input ports for a legacy analog device such as the DVD player 20 shown in FIG. 1. An analog NTSC video signal from the Video In terminal 26 can be converted to digital in a video analog-to-digital converter (ADC) 38 and MPEG-encoded in an MPEG encoder 40. Similarly, an analog audio signal from the Audio In terminal 36 may be converted to digital by an audio ADC 42 and MPEG-encoded in the MPEG encoder 40, which, in accordance with principles known in the art, multiplexes the audio and video signals and outputs a multiplexed stream.

In accordance with present principles, the MPEG stream from the MPEG encoder 40 can be sent directly (through a line 43) to a PLC Interface 44, the details of which are described further below in reference to FIG. 5. In addition or alternatively, the multiplexed output MPEG signal may be sent to the PLC Interface 44 through an internal host bus 46 that can be, for example, a PCI bus having a bus width of sixty four (64) bits. As shown in FIG. 2, the PLC Interface 44 communicates with the power line 22 shown in FIG. 1 through the server power plug 24. Other components of the server 12 are also connected as shown to the host bus 46.

Additionally, the server 12 may receive an analog cable signal at a cable terminal 48, and that analog cable signal can be tuned and demodulated in a tuner/frontend 48 in accordance with cable principles known in the art. A video output from tuner/frontend 48 can be digitized by a cable video ADC 50 and MPEG encoded in a cable MPEG encoder 52. Similarly, an audio output from the tuner/frontend 48 can be digitized by a cable audio ADC 54 and MPEG encoded in the cable MPEG encoder 52, the output stream from which is sent to the PLC Interface 44 directly and/or through the internal host bus 46.

FIG. 2 shows that the processor 14 of the server 12 also communicates with the host bus 46. It is to be understood that the processor 14 controls the server 12 constituent parts and runs the control software program stored in a memory 56. If desired, an input device such as but not limited to a keypad 58 can be used to send input data to the processor 14 through the bus 46. An output device such as but not limited to an LCD display 60 can display data from the processor 14, such as, for example, tuning status, network status, active AV ports, error messages, etc. If desired, the modem 18 shown in FIG. 1 may be connected to an ethernet port 62 which in turn is connected to an ethernet interface 64 and thence to the bus 46.

Also, a hard disk drive (HDD) 66 can be connected to the bus 46 through an Integrated Drive Electronics (IDE) Interface 68. Audio/video and other data sent through the bus 46 can be stored in the HDD 66. For example, the above-mentioned MPEG encoder outputs can be recorded in the HDD 46. Also, if desired the ethernet interface 64 can receive data from the Internet and send it to the HDD 66.

Since the bandwidth of a PCI bus typically is more than 500 Mbps, and a typical MPEG-HD stream rate is 20 Mbps, the bus 46 has enough bandwidth to simultaneously carry several MPEG streams.

Figure 3:
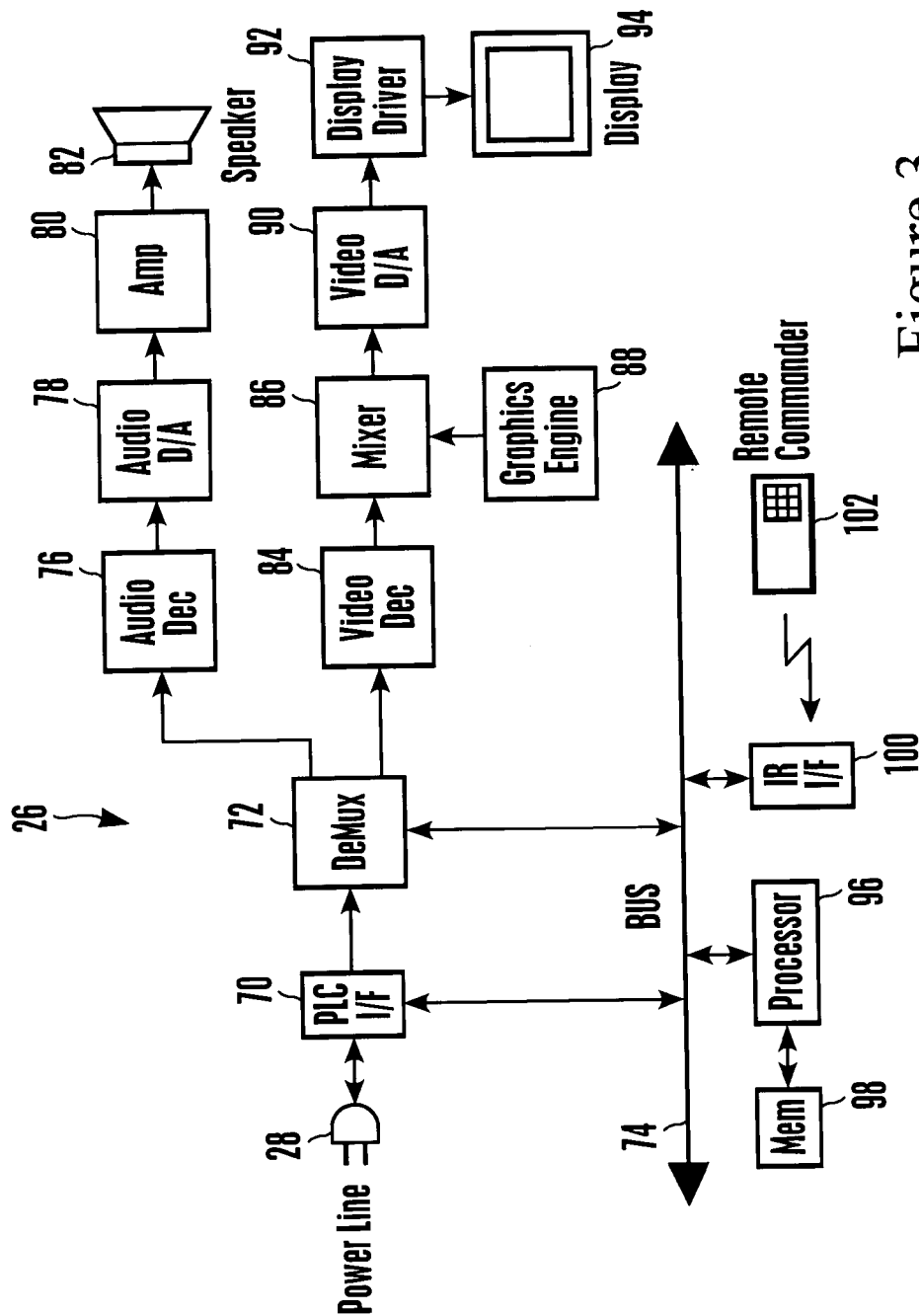
FIG. 3 is a block diagram of a client TV with a PCI host bus.

Now referring to FIG. 3, the details of one preferred non-limiting PCI client, and for example the TV 26, can be seen. The TV power line plug 28 is connected to a TV PLC interface 70 the principles of which, like those of the server's PLC interface 44, are described more fully below in reference to FIG. 5. As shown, the TV PLC interface 70 is connected to a demultiplexer 72 directly and to the TV's host bus 74, which in the preferred embodiment is a PCI bus that runs at a bus width of, e.g., sixty four (64) bits. The demultiplexer 72 is also connected to the host bus 74 as shown. Other components of the TV 26 are also connected as shown to the host bus 74.

In accordance with MPEG principles known in the art, the demultiplexer 72 separates the audio from the video, with audio data being sent for decoding to a audio decoder 76, analogized by an audio digital-to-analog converter (DAC) 78, amplified by an audio amplifier 80, and played on a speaker 82. On the other hand, video from the demultiplexer 72 is sent to a video decoder 84 for decoding, and then to a mixer 86 to, if desired, mix in graphics from a graphics engine 88 with the video. The signal is then sent to a video DAC 90 for analogizing and then to a display driver 92 for driving a video display 94 in accordance with the demanded image represented by the video signal.

The TV 26 also preferably includes a processor 96 accessing the internal host bus 74 of the TV for controlling the components of the TV 26. It is to be understood that some bus connections may be omitted for clarity in FIG. 3. Also, the processor 96 runs the control software program stored in a memory 98. If desired, an IR Interface 100 can receive commands from a remote commander 102 in accordance with TV remote control principles known in the art. The commands are sent to the processor 96 through the bus 74 as shown. In any case, through the respective PLC interfaces 77, 44, the TV processor 96 and server processor 14 can exchange asynchronous data (commands, data, etc.) with each other over the power line 22 shown in FIG. 1.

Figure 4:
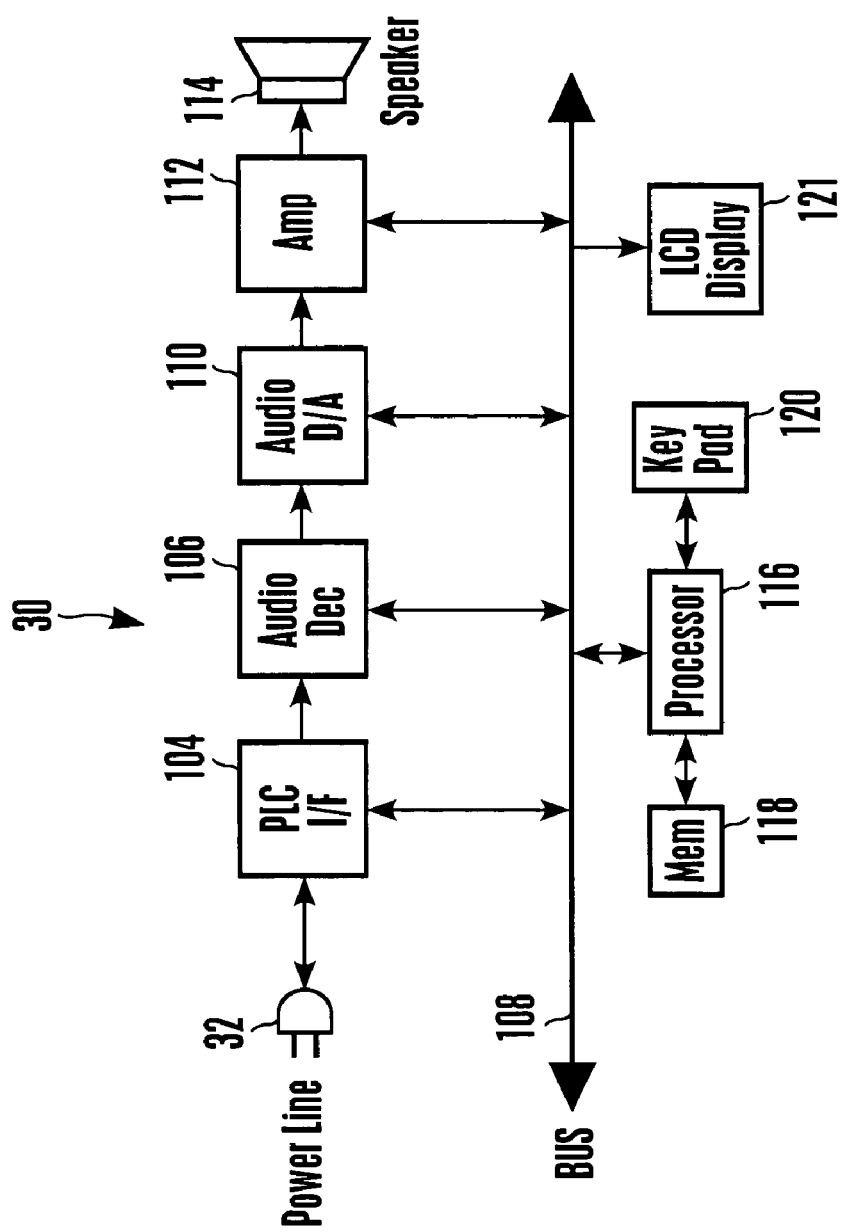
FIG. 4 is a block diagram of a client audio component with an eight or sixteen bit host bus.

Now referring to FIG. 4, an example of a client having a simpler internal host bus than, e.g., a PCI bus is shown, and in particular the client audio system 30 is shown. As was the case with the TV 26, the client audio system 30 communicates information over the power line 22 shown in FIG. 1 through its respective power line plug 32, which is connected to an audio client PLC interface 104, the principles of which, like those of the server's PLC interface 44 and TV PLC interface 70, are described more fully below in reference to FIG. 5. The audio client PLC interface 104 sends data directly to an audio decoder 106 for decoding, and also sends and receives data from an internal host bus 108, to which the other components of the client 30 are also connected as shown. The host bus 108 shown in FIG. 4 can be, for example, an inexpensive 68 k-type bus with a bus width of eight (8) bits. The output signal from the decoder 106 is analogized in an audio client DAC 110, amplified at an amplifier 112, and played over a speaker 114. The audio client 30 may also include a simple processor 116 that communicates with the host bus 108 and with a memory 118. The processor 116 shown in FIG. 4 runs the control software program stored in the memory 118. The user can enter commands (playback, pause, skip, etc.) using an input device such as but not limited to a key pad 120, with the commands being sent to the processor 116. The processor 116 can exchange asynchronous data (commands, data, etc.) with the processor 14 of the server 12 through the power line 22 shown in FIG. 1.

Figure 5:
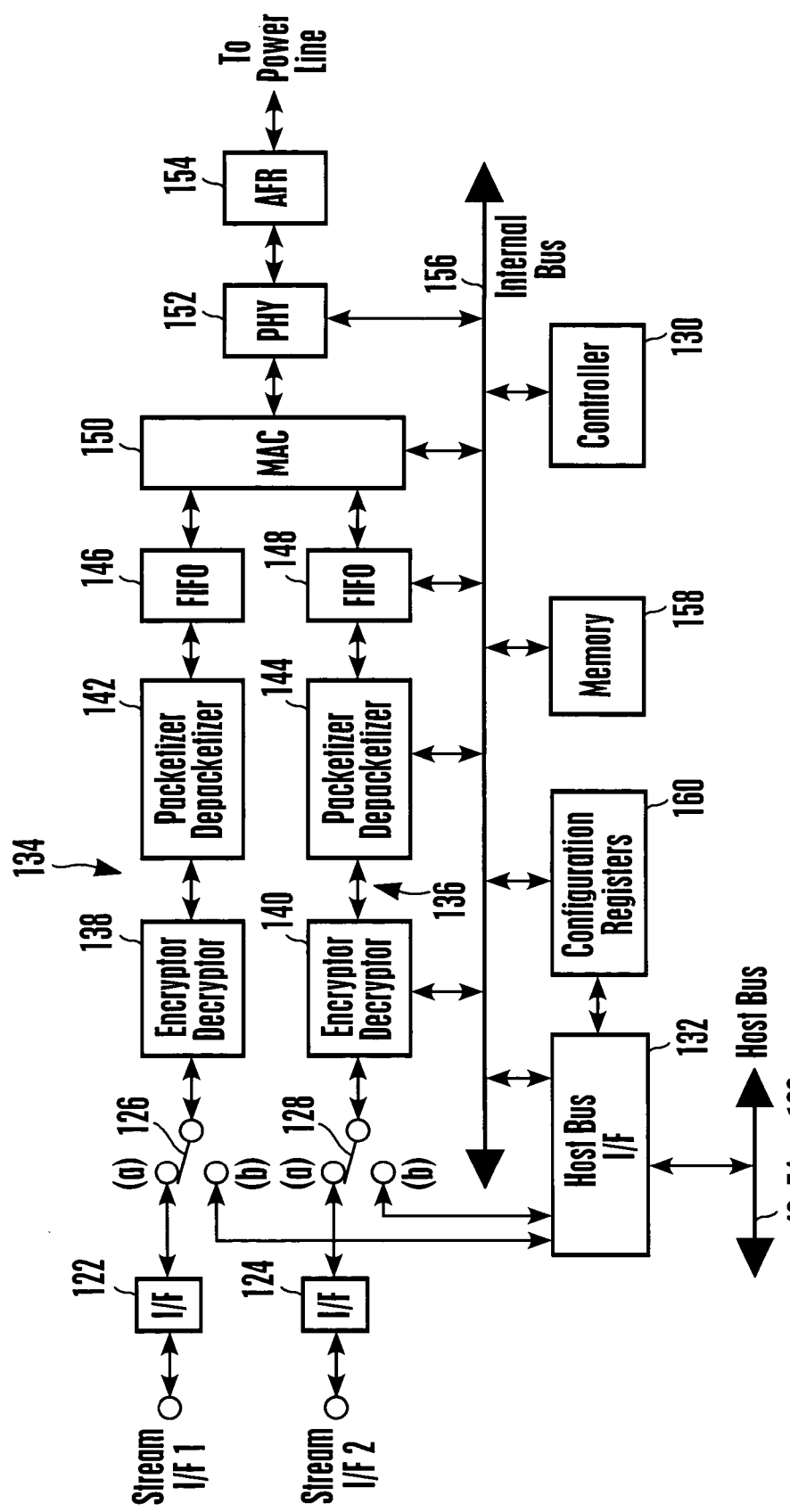
FIG. 5 is a block diagram of the PLC Interface of the present invention.

The details of the PLC interface of the present invention can now be seen in reference to FIG. 5. As shown, the PLC interface preferably has at least one and more preferably at least two dedicated bidirectional data stream ports, labelled "Stream I/F 1" and "Stream I/F 2" in FIG. 5, each of which is connected to a respective port interface 122, 124. The port interfaces 122, 124 are configurable to send or receive, for example, an MPEG stream or a digital visual interface (DVI) stream or audio stream.

In the case of the PLC interface 44 of the server 12, the associated data stream ports "Stream I/F 1" and "Stream I/F 2" are respectively connected to the MPEG encoders 40, 52. In the case of the PLC interface 70 of the client TV 26, at least one of the associated data stream ports "Stream I/F 1" and "Stream I/F 2" is connected to the demultiplexer 72. In the case of the audio client 30, at least one of the associated data stream ports "Stream I/F 1" and "Stream I/F 2" is connected to the audio decoder 106.

As shown in FIG. 5, each port interface 122, 124 is connected to a respective switch 126, 128 that is controlled by a controller PLC interface controller 130 to connect the stream I/F/ports either to a PLC host bus interface 132 or to respective processing lines 134, 136.

Importantly, the preferred host bus interface 132 is an interface that is configured to communicate with an external host bus, for example one of the host buses 46, 74, 108 shown in FIGS. 2–4 (respectively, the server host bus, the TV host bus, and the audio client host bus). Accordingly, when the PLC interface of the present invention is used in a PCI application (such as the server 12 and TV 26), it is configured as a PCI type bus and has a bus width accordingly, e.g., sixty four bits. On the other hand, when the PLC interface of the present invention is used in a non-PCI application such as for the audio client 30, it is configured appropriately, e.g., for a 68k-type bus having a bus width of eight or sixteen bits.

Returning to FIG. 5, each processing line 134, 136 includes a respective encryptor/decryptor 138, 140 that encrypts (for sending) or decrypts (during receipt) of a stream, for example, based on, e.g., the Digital Transmission Content Protection format. Each encryptor/decryptor 138, 140 is connected to respective packetizer/depacketizer 142, 144 that packetizes (for sending) or depacketizes (for receipt of) the stream and timestamp each packet. Each packetizer/depacketizer 142, 144 is configurable as appropriate for the particular type of data being processed. One or a combination of several protocols can be chosen, for example, RTP and UDP/IP. With more specificity, in the case of incoming data, for instance, the data is RTP-packetized first and then UDP/IP-packetized.

Each preferred processing line 134, 136 also includes a respective First-In First-Out (FIFO) Buffer Memory 146, 148 that temporarily store incoming or outgoing data. The FIFOs 146, 148 are in turn connected to a Media Access Controller (MAC) 150 which is connected to a Physical Layer (PHY) component 152 to control data based on the power line network protocol. The MAC controller 150 may have a secondary encryptor/decryptor if desired. For example, the utility known as "HomePlug 1.0" uses 56-bit DES for the secondary encryption. The PHY component 152 is connected to an Analog Frontend (AFE) 154 that filters and amplifies the input/output analog signal from/to the power line 22 shown in FIG. 1. Thus, a network communication port that communicates with the backbone of the network is established at the output of the AFE 154.

Although not all bus connections are shown, it is to be understood that preferably, all of the components discussed above in the PLC interface are connected to a PLC internal bus 156. The host bus interface 132 is also connected to the PLC internal bus 156, as is the PLC controller 130, a memory 158, and configuration registers 160.

In operation, the external host, for example, the processor 14 of the server 12, writes or reads the configuration registers 160 through the host bus interface 132 of the server's PLC interface to control the PLC interface. All the components in the PLC interface are connected to the internal PLC bus 156 and are controlled by the PLC controller 130, the software program for which can be stored in the memory 158.

It may now be appreciated that in this way, the host bus interface 132 may be configured as appropriate by the processor of the particular network 10 component with which it is associated to have the appropriate bus width. Or, it can be configured at manufacture to have a particular bus width and then used only on those network components that have a complementary bus width.

When the component with which the PLC interface shown in FIG. 5 is in a transmission mode, a stream is received by one or both of the port interfaces 122, 124 and sent along the appropriate processing line 134, 136 for processing as described above. In this mode, the switches 122, 124 are in position "a" in FIG. 5. In the MAC controller 150, the stream is rendered into data units that are appropriate for transmission, e.g., a header can be attached to each data unit, with the header including information on the transmitter and the destination (ID, etc.). The skilled artisan will appreciate that when receiving data, the data essentially flows backward from the above flow. It is to be understood that the processing lines 134, 136 are independent of each other, such that one can transmit while the other is receiving.

When transmitting, the transmission may be either isochronous or asynchronous. In the isochronous mode, a certain access slot is reserved at every bus cycle of the network. The data is sent without waiting for or disturbed by other communications. Each packet interval remains the same on the reception side because the packet is output based on its timestamp. In the asynchronous mode, transmission is performed only when the network is not occupied by other communications. If the network stays busy for a long time, the FIFOs 146, 148 might overflow. Accordingly, when the FIFO occupancy is more than a certain threshold, the PLC controller 130 can request the source device to stop sending data. As is known in the art, the asynchronous mode uses no timestamp.

Having described the operation of the processing lines 134, 136 of the PLC interface of the present invention when the stream I/F 1 and 2 ports are used, attention is now turned to the operation of the host bus interface 132, wherein the switches 126, 128 are in position "b" in FIG. 5. According to present principles, when the host bus interface 132 is used, data is processed by the processing lines 134, 136 in the same way as when a dedicated port 122, 124 is used, with the following exceptions. More options are afforded when using the host bus interface 132, because the host bus interface 132 can send incoming data from the particular host bus (e.g., the host bus 46, 74, or 108 shown in FIGS. 2–4, respectively) directly to the MAC 150 when encryption and packetizing are not required when, for instance, the data already is packetized before it arrives at the PLC interface. In the receive mode, the MAC 150 can send the data directly to the host bus interface 132, such that depacketizing can be performed outside of the PLC interface. This mode is preferred to send a short command that does not require encryption or time stamping.

In general, the host bus 46/74/108 associated with a PLC interface is not isochronous. Access slots are not reserved. Thus, when an isochronous packet is received, some tolerance is required in timestamp-based packet injection. Also, the host bus might be busy when the time of the timestamp arrives, in which case the packet is output to the host bus once it is idle. Consequently, the FIFOs 146, 148 must be large enough to buffer incoming data without overflow until the host bus becomes accessible.

In addition to the above operation, both of the dedicated data stream ports 122, 124 and the host bus interface 132 can be used simultaneously. In this case, the MAC 150 handles two streams for the dedicated data stream ports and one or more other streams for the host bus interface 150. Directions and isochronous/asynchronous mode of each stream can be configured independently.

With the above structure, the server 12 can send a cable TV program to the TV 26 and a video stream from the DVD player 20 to another client TV. Simultaneously, the server 12 can send an audio stream to the client audio system 30. In this case, the dedicated ports 122, 124 of the server PLC interface 44 are used for the two video streams and the host bus interface of the server PLC interface 44 handles the audio stream from, e.g., the HDD 66. The host bus interface can send more streams if more bandwidth of the server host bus 46 is available.

Figure 6:
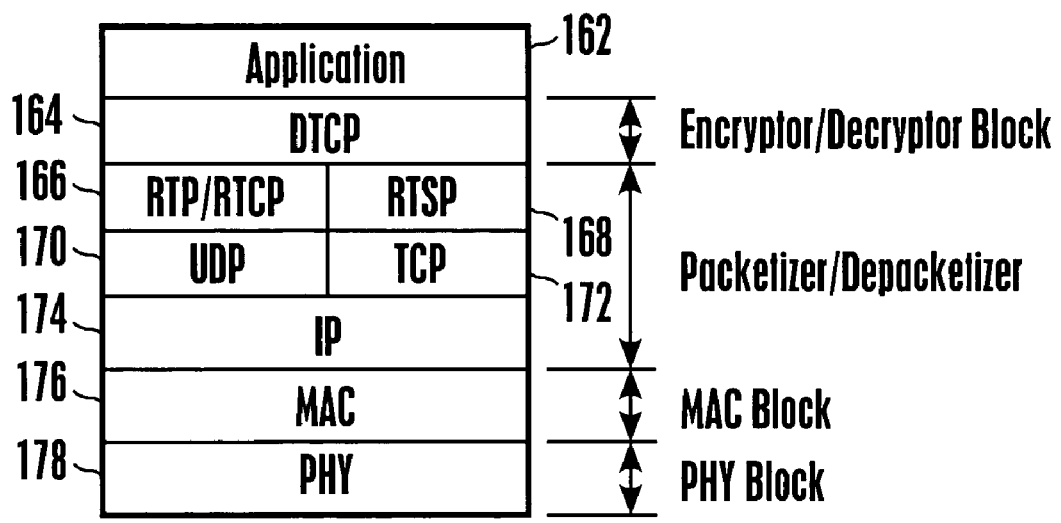
FIG. 6 is a schematic diagram of a protocol stack.

FIG. 6 shows a non-limiting example of a communications protocol stack that can be used with the present invention. An application layer 162 such a an MPEG transport stream is placed at the top of the stack. A second layer 164 is a DTCP layer, which as mentioned above is processed by the encryptor/decryptor 138, 140 of the PLC interface. The next layers are RTP/RTCP 166 and RTSP 168, TCP 172 and UDP 170 layers, and below those an IP layer 174. The packetizer/depacketizer 142, 144 of the PLC interface handle packetizing. The two bottom layers are a MAC layer 176 and a PHY layer 178, which are respectively executed by the MAC 150 and PHY 152 of the PLC interface. As will be apparent to the skilled artisan, when transmitting, data is processed from the top to the bottom, and when receiving, from bottom to top.

One application of the network 10 described above is an audio server-client system. The server uses a fast PCI bus to simultaneously send several audio streams to clients. Audio streams read from the internal HDD are sent to the PLC interface over the PCI bus. No fast bus is used in an inexpensive audio client. The host is an 8-bit legacy bus or a simple I2C bus. A received stream is sent to the decoder using the stream interface port.

The principles above can be applied to other networks, for example, 802.11 wireless or UWB networks. The host buses may be serial buses, for example, an I2C bus. Instead of using an RTP/UDP/IP stack, any other protocol stack can be applied. Usually, a simpler, fewer-layer stack is used for isochronous transmission to avoid redundant overheads. A typical example is the IEEE 1394 isochronous protocols, which is simpler than the asynchronous case.

With the present PLC interface, data stream interfacing is flexible. The best interface can be selected for transmitting or receiving. Both dedicated data stream ports and the host bus interface can be used simultaneously. Furthermore, the direction and isochronous/asynchronous mode of each stream is independently configurable. Additionally, the packetizer/depacketizer block is configurable. One or more protocols can be selected, e.g., RTP/UDP/IP, and the same hardware fits all protocols. Still further, each (de)packetizer may be independent. For example, one packetizer can handle TCP/IP and another can handle RTP/UDP/IP at the same time.

While the particular UNIVERSAL NETWORK INTERFACE FOR HOME NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A home entertainment network, comprising:
   at least one network path;
   at least a first component having a data bus of a first bus width;
   at least a second component having a data bus of a second bus width, the second bus width being different from the first bus width; and
   respective network interfaces connecting each component to the network path, wherein each network interface includes:
   at least one data stream port;
   at least one host bus interface communicating with a host bus of the respective component;
   at feast one network communication port communicating with a common network backbone; and
   at least one switch selectively connecting the network communication port to either the host bus interface or the at least one data stream port, wherein each network interface includes at least one packetizing/depacketizing component between the switch and the network communication port and at least one internal bus establishing at least a portion of a communication path between the host bus interface and the network communication port, whereby the host bus interface can communicate data directly to the network communication port, bypassing the packetizing/depacketizing component.

2. The network of claim 1, wherein the host bus interface is configured to have a bus width equal to the bus width of the component with which it is associated.

3. The network of claim 1, further comprising a server having a third network interface communicating with the network, wherein the first component is a TV and the second component is an audio client component.

4. The network of claim 2, wherein the component configures the host bus interface.

5. First and second interfaces for communicating data in a home network having at least a server, a first component having a first host bus having a first bus width, and a second component having a second host bus having a second bus width, comprising:
   the first interface including a host bus interface configured for communicating data with the first host bus and having the first bus width, the first interface also having at least one data port, a network port connectable to the network, and a switch selectively connecting the network port to either the host bus interface or data port; and
   the second interface including a host bus interface configured for communicating data with the second host bus and having the second bus width, the second interface also having at least one data port, a network port connectable to the network, and a switch selectively connecting the network port to either the host bus interface or data port, the interfaces being identical in configuration and operation except for the configuration of the respective host bus interfaces, wherein each interface includes at least one packetizing/depacketizing component between the switch and the network port, wherein each interface includes at least one internal bus establishing at least a portion of a communication path between the host bus interface and the network part, whereby the host bus interface can communicate data directly to the network port, bypassing the packetizing/depacketizing component.

6. The interfaces of claim 5, wherein the host bus interface of each interface is configurable to have a bus width equal to the bus width of the component with which it is associated.

7. The interfaces of claim 5, wherein the first component is a TV and the second component is an audio client component.

8. The interfaces of claim 6, wherein the components configure the host bus interface of their respective interfaces.

9. A home entertainment system, comprising:
   at least a first component having a first host bus with a first bus width and communicating with a network using a first universal network interface; and
   at least a second component having a second host bus with a second bus width and communicating with a network using a second universal network interface, each universal network interface having a respective host bus interface configurable for communicating with a component host bus of the respective component, the universal network interfaces being identical to each other at least prior to configuration of the respective host bus interfaces, wherein each universal network interface includes at least one data stream port, at least one network communication port communicating with a common network backbone, and at least one switch selectively connecting the network communication port to either the host bus interface or the at least one data stream port, wherein each universal network interface includes at least one packetizing/depacketizing component between the switch and the network communication port, wherein each universal network interface includes at least one internal bus establishing at least a portion of a communication path between the host bus interface and the network communication port, whereby the host bus interface can communicate data directly to the network communication port, bypassing the packetizing/depacketizing component.

10. The system of claim 9, wherein each component configures the bus width of the host bus interface of the respective universal network interface.

11. The system of claim 9, further comprising a server having a third network interface communicating with the network, wherein the first component is a TV and the second component is an audio client component.

* * * * *